(12) United States Patent
Simpson

(10) Patent No.: US 8,501,349 B2
(45) Date of Patent: Aug. 6, 2013

(54) HYDROGEN-BASED ELECTROCHEMICAL ENERGY STORAGE

(75) Inventor: Lin Jay Simpson, Lakewood, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 243 days.

(21) Appl. No.: 13/120,222

(22) PCT Filed: Sep. 24, 2009

(86) PCT No.: PCT/US2009/058158
§ 371 (c)(1),
(2), (4) Date: Mar. 22, 2011

(87) PCT Pub. No.: WO2010/036761
PCT Pub. Date: Apr. 1, 2010

(65) Prior Publication Data
US 2011/0171527 A1    Jul. 14, 2011

Related U.S. Application Data

(60) Provisional application No. 61/099,789, filed on Sep. 24, 2008.

(51) Int. Cl.
*H01M 4/13* (2010.01)
*H01M 4/02* (2006.01)

(52) U.S. Cl.
USPC ........................ 429/218.2; 429/209

(58) Field of Classification Search
USPC ...................................... 429/218.2
See application file for complete search history.

(56) References Cited

U.S. PATENT DOCUMENTS 5,712,054 A   1/1998  Kejha
6,905,794 B2  6/2005  Kashino
(Continued)

FOREIGN PATENT DOCUMENTS

JP   05-242906   9/1993
JP   05242906    9/1993
(Continued)

OTHER PUBLICATIONS

Li, "Hydrogen Storage in Metal—Organic Frameworks by Bridged Hydrogen Spillover", Journal of American Chemical Society, 2006, 128, pp. 8136-8137.

(Continued)

*Primary Examiner* — Helen O Conley
(74) *Attorney, Agent, or Firm* — Paul J. White; W. LaNelle Owens; John C. Stolpa

(57) ABSTRACT

An energy storage device (100) providing high storage densities via hydrogen storage. The device (100) includes a counter electrode (110), a storage electrode (130), and an ion conducting membrane (120) positioned between the counter electrode (110) and the storage electrode (130). The counter electrode (110) is formed of one or more materials with an affinity for hydrogen and includes an exchange matrix for elements/materials selected from the non-noble materials that have an affinity for hydrogen. The storage electrode (130) is loaded with hydrogen such as atomic or mono-hydrogen that is adsorbed by a hydrogen storage material such that the hydrogen (132, 134) may be stored with low chemical bonding. The hydrogen storage material is typically formed of a lightweight material such as carbon or boron with a network of passage-ways or intercalants for storing and conducting mono-hydrogen, protons, or the like. The hydrogen storage material may store at least ten percent by weight hydrogen (132, 134) at ambient temperature and pressure.

20 Claims, 2 Drawing Sheets

U.S. PATENT DOCUMENTS

| | | |
|---|---|---|
| 7,186,474 B2 | 3/2007 | Jang |
| 7,309,535 B2 | 12/2007 | Ovshinsky |
| 2006/0019162 A1 | 1/2006 | Shirahige |
| 2006/0026900 A1 | 2/2006 | Jang |

FOREIGN PATENT DOCUMENTS

| | | |
|---|---|---|
| JP | 05-275108 | 10/1993 |
| JP | 05275108 | 10/1993 |
| JP | 2003277037 | 10/2003 |
| WO | 0117900 A1 | 3/2001 |
| WO | 2006111005 A1 | 10/2006 |

OTHER PUBLICATIONS

Orimo, "Hydrogen Desorption Property of Mechanically Prepared Nanostructured Graphite", Journal of Applied Physics, 2001, vol. 90, No. 3, pp. 1545-1549.

International Search Report, dated Apr. 30, 2010, for International Application No. PCT/US09/058158.

International Preliminary Report on Patentability and Written Opinion of the International Searching Authority, dated Apr. 30, 2010, for International Application No. PCT/US09/058158.

Engtrakul et al., "Reactions and Reversible hydrogenation of single-walled carbon nanotube anions", Journal of Materials Research, Nov. 14, 2012, vol. 27, No. 21, pp. 2806-2811.

HYDROGEN-BASED ELECTROCHEMICAL ENERGY STORAGE

CROSS-REFERENCE TO RELATED APPLICATIONS

This application claims the benefit of U.S. Provisional Application No. 61/099,789 filed Sep. 24, 2008, which is incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Energy storage requirements continue to grow as the electronic, portable power, and energy infrastructure industries expand and transition away from more historic non-renewable energy supplies. For example, there has been a renewed interest in batteries, fuel cells, and other energy storage devices for use in electric and hybrid automobiles. Similarly, there is ongoing research in ways to make lighter and more efficient batteries for electronic devices ranging from portable computers to cellular phones and other wireless communication devices. General goals for battery manufacturers include providing long life and significant power levels with the least amount of weight.

More specifically, one of the most critical parameters for new energy storage technologies and designs is the demand for higher energy densities (i.e., energy storage per unit of battery or storage device weight). Additionally, there is growing concern over potential long term environmental impacts of product manufacture and use, and, the energy storage industry continues to search for storage devices that can make use of environmentally benign materials while still providing desirable energy densities.

Over the past fifty years, lithium-based energy storage technologies have become preeminent for use in providing portable power, which is due, in large part, to the relatively high energy density obtainable with lithium. Hydrogen may provide improved lightweight energy storage when compared with lithium because hydrogen is the lightest element and has energy densities of up to 40,000 Watt hours per kilogram (WH/Kg). Hydrogen-based energy storage is presently being heavily investigated with much of the research concentrating on the use of hydrogen in fuel cell applications.

However, a number of problems have made use of hydrogen difficult for energy storage devices. For example, problems with using hydrogen in fuel cells include substantial cost, durability of cells, temperatures that differ significantly from ambient temperatures, and hydrogen storage issues. Hydrogen fuel cells have yet to be designed that are cost effective to produce, use, and maintain. This is in part due to problems with: providing an ability to store hydrogen gas in lightweight high-pressure containers; the use of expensive noble metal catalysts to dissociate the hydrogen; and the relatively complex components needed for fuels transport. Hence, there remains a need for energy storage devices with high energy densities. Preferably, such devices may be designed to more effectively utilize hydrogen (e.g., provide hydrogen-based energy storage) while being less expensive to produce and while using more environmentally benign materials.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

A hydrogen-based electrochemical storage device is provided with enhanced energy density when compared with prior storage devices such as lithium-based batteries. In some embodiments, the storage device includes a hydrogen-sorption-based electrode, a counter electrode providing a material with an affinity to hydrogen, and a cation exchange membrane or an anion exchange membrane (e.g., an ion conducting membrane). Storage devices as described herein address hydrogen storage issues that hindered adoption of prior hydrogen-based storage devices by integrating hydrogen storage and electrochemical processes into a single monolithic device. One distinction between these hydrogen-based storage devices and prior fuel cells and batteries is that the hydrogen may be stably stored at ambient conditions (or other operating temperatures and pressures that benefit a particular application and/or design).

The hydrogen storage (sometimes labeled a "hydrogen-storing electrode") may be formed all or in part of (or include) a lightweight storage material such as a microporous or hydrogen-permeable material. Typically, the hydrogen is stored in atomic or bound molecular form rather than as hydrogen gas, and the stored hydrogen is retained within the storage material of the electrode without strong chemical bonds (e.g., without the typical carbon-hydrogen (C—H) bond or similar chemical bond that may require significant energy to allow the hydrogen to flow from the electrode to the counter electrode).

More particularly, an energy storage device is provided that includes a counter electrode, a storage electrode, and an ion conducting membrane positioned between the counter electrode and the storage electrode. The counter electrode is formed of one or more materials with an affinity for hydrogen, and it may include an exchange matrix for elements/materials selected from the non-noble materials that have an affinity for hydrogen. The storage electrode is loaded with hydrogen (e.g., atomic or mono-hydrogen, dihydrogen, and the like) that is adsorbed by a hydrogen storage material such that the hydrogen may be stored with substantially lower chemical bonding (e.g., bonding with less energy than in a typical chemical bond such as a C—H chemical bond). The hydrogen storage material is typically formed of a lightweight material (e.g., with a network of passageways/channels/pores/intercalants for storing and conducting mono-hydrogen, dihydrogen, and/or protons) such as from a material or element with an atomic weight of less than about 20 such as carbon, boron, or the like.

In some embodiments (such as an embodiment in which oxygen from air is used by the counter electrode), the hydrogen storage material stores at least 10 percent by weight hydrogen at ambient temperature and pressure. For example, in some cases, 15 percent by weight hydrogen is loaded into the storage electrode, such that the energy storage device has an energy density that is greater than about 4500 WH/Kg. In some embodiments, the hydrogen that is disassociated from a hydrogen-containing material with the counter electrode may be electrochemically transported to the hydrogen storage material to charge the storage device.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Figure 1:
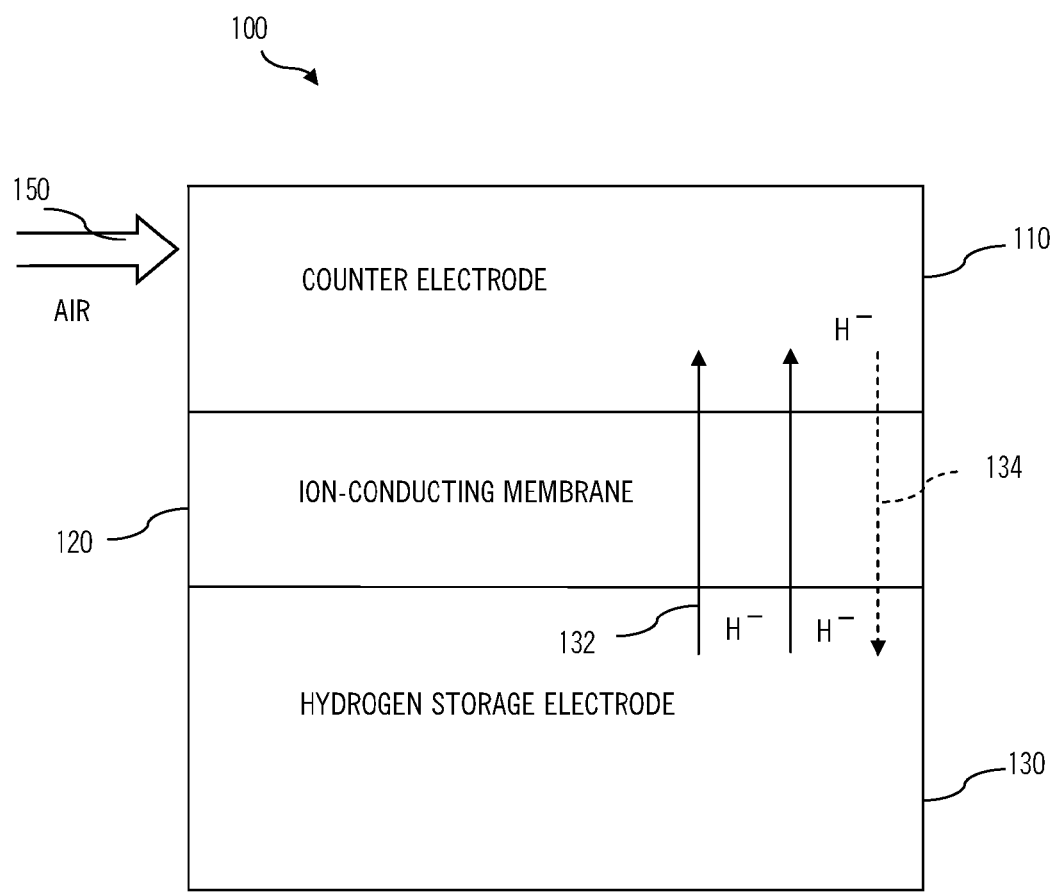
FIG. 1 illustrates schematically a hydrogen-based electrochemical energy storage device of one embodiment.

The following description is directed generally toward hydrogen electrochemical storage devices that provide storage of hydrogen (e.g., atomic hydrogen or bound molecular hydrogen) on a lightweight lattice, such as an electrode formed with carbon, boron, oxygen, nitrogen, or the like and/or a combination or compounds thereof It was recognized that one of the main issues or difficulties with prior hydrogen storage devices was that the typical chemical bonds formed were too strong for efficient removal of the stored hydrogen.

Specifically, several studies have investigated the binding energy of atomic hydrogen on materials like carbon. One study showed that approximately 7.4 percent by weight of atomic hydrogen can be stored on milled graphite but the hydrogen is desorbed only after being heated to between about 700 K and about 1000 K. Another demonstration showed that over about 5 percent by weight atomic hydrogen can be stored on lightweight porous material structures (e.g., activated carbon, SWNTs (single-walled carbon nanotubes), and the like) at ambient temperature and pressure conditions. With such storage, the hydrogen begins to desorb at temperatures of about 400 K. This significantly reduced desorption temperature indicated to the inventor that the atomic hydrogen was stored on the carbon lattice in a way that may be effectively utilized in batteries and other energy storage devices, perhaps similarly to recent "spillover" work.

Other hydrogen storage studies have demonstrated that over about 4 percent by weight (wt %) of atomic hydrogen can be reversibly stored using dihydrogen gas and platinum, nickel, palladium, and/or other catalysts on highly porous carbon-based materials like metal-organic frameworks, activated carbon, or SWNTs. In this work, the dihydrogen gas was disassociated by the metal catalysts and the atomic hydrogen spilled over onto the carbon-based support structure. While spillover has been known for years, the more recent work demonstrated large hydrogen storage that may potentially be reversibly adsorbed and desorbed at ambient conditions, which confirms the inventor's findings in storage device prototypes/modeling that atomic hydrogen can travel in or along the storage material to and from the electrolyte.

While many different hydrogen battery devices have been developed, these devices have relied upon metal alloys for storing the hydrogen. The use of metal alloys to store hydrogen limits the ultimate energy density of the battery since metals are relatively heavy. For example, metal hydride batteries are typically limited to densities of less than about 4 percent by weight hydrogen. Additionally, the metal hydrides that hold the most hydrogen also tend to have stronger binding energies making them less efficient for use as electrodes in batteries as the stronger bindings tend to not allow flow to a counter electrode. Further, metal hydrides are sensitive to contamination, are relatively expensive, and are very exothermic upon hydrogen loading (which may force designers to include heat exchange components in the metal hydride energy storage devices).

To address the relatively low energy density of the metal-based hydrogen storage alloys, some storage device designs use air electrodes because the air is not stored by the battery and, thus, does not affect the energy density. However, this limits the application of these devices to environments where air is present and may require that the air electrode performs efficient oxygen dissociation while not being detrimentally affected by other contaminants in the atmosphere. Furthermore, in the case where proton-exchange electrolytes are used in storage devices, the acidic nature of the electrolyte corrodes the hydrogen-absorbing alloys, which can decrease functionality and service life. In some cases, this issue can be addressed using an anion-exchange-based electrolyte, but, since anion mobility is typically lower than that of protons, battery performance may be detrimentally affected. In general, chemical hydrides may also be used for hydrogen-based batteries to increase the energy densities. However, the stronger binding associated with chemical-based hydrides results in inefficient battery operation, which limits the applicability of chemical hydrides for batteries and other energy storage devices.

As will become clear upon reading the following description, the inventor's storage devices address the problems with prior hydrogen-based devices by utilizing a hydrogen storage mechanism that can be described as including adsorption rather than absorption provided by typical metal and chemical hydrides. Such an adsorption-based hydrogen storage mechanism enables hydrogen to be stored with relatively lower binding by materials that are inherently less reactive and, thus, more corrosion resistant. Thus, both proton and anion conducting electrolytes can be used to maximize performance based on the particular application and design parameters. The hydrogen-based electrochemical energy storage devices described herein can be constructed with substantially improved performance when compared to prior hydride-based devices.

FIG. 1 illustrates in simplified form an energy storage device 100 that may operate based on efficient hydrogen storage with weaker bonding within a lightweight material. For example, the weaker bonding may be provided in one of a storage device's electrodes for example. As shown, the hydrogen-based electrochemical energy storage device 100 includes a counter electrode 110 that is formed of materials with an affinity for hydrogen. The device 100 also includes a hydrogen storage electrode 130 that stores hydrogen in an atomic or molecular bound form. In some regards, the hydrogen storage electrode 130 may be considered a hydrogen sorption electrode because the hydrogen is not chemically bound (e.g., the electrode 130 is substantially free of typical C—H bonds).

Further, as shown, an ion conducting or ion exchange membrane 120 is positioned or sandwiched between the counter electrode 110 and the hydrogen storage electrode 130. The membrane 120 is configured or designed to that allow hydrogen ions 132 to pass from the storage electrode 130 to the counter electrode 110 (and also back as shown at 134 when the device 100 is adapted to be reversible/rechargeable or to be operated in this manner). The counter electrode 110 may be formed from or with a variety of materials and configurations that enable electrochemical interactions with hydrogen. The ion-exchange membrane 120 may also be formed from or using a variety of materials and/or have a number of configurations that may be selected to enable ion transport between the electrodes 110, 130 as shown with arrows 132 (and, optionally, with arrow 134). The membrane 120 also functions to maintain a physical separation between electrodes 110, 130 that inhibits interaction of stored hydrogen in electrode 130 with reactive components of the counter electrode 110 or other species in the surrounding environment.

One useful aspect of the device 100 (and other storage embodiments/designs) is the configuration of the hydrogen storage electrode 130 to provide an effective hydrogen storage mechanism. The storage electrode 130 is configured both to store hydrogen atoms, highly stretched dihydrogen molecules, and/or bound molecules and to allow conduction or movement of the hydrogen such that these atoms and/or molecules may participate in the electrochemical processes in the device 100. Thus, unlike the metal hydrides or chemical hydrides typically used to store hydrogen, the storage electrode 130 may be formed with relatively "inert" and lightweight materials such as carbon, boron, and the like. In these lightweight materials, the hydrogen is stored on or in the electrode materials with a substantially weaker binding than is typically the case with chemical bonding (e.g., bonding between carbon and hydrogen atoms, for example). This weaker binding in electrode 130 is still sufficient to store substantial amounts of hydrogen in the storage electrode 130 even at room temperature or temperatures above ambient. However, the weaker binding is desirable as it enables the transport and low energy barriers that facilitate for efficient electrochemical processing.

Generally, there is no particular limit to the materials and configurations that may be used for the electrodes 110, 130 and the ion conducting membrane 120, and conventionally known electrodes/electrode material and electrolytes may be used in device 100. It may be preferable, though, to use materials and component configurations that provide desirable levels of performance for a given set of operating conditions and/or design parameters. The following description provides some specific examples of the materials and configurations that may be used for the components of the device 100, but these are only intended to provide exemplary, and not limiting, examples of how the device 100 may be implemented in practice.

In one example of the device 100, the hydrogen storage electrode 130 is formed of a sealed lightweight material such as porous carbon, intercalated graphite, and/or intercalated boron that is electrochemically or chemically loaded with hydrogen. The storage electrode 130 may be integrated within one device 100 (which may provide a housing not shown) with an ion conducting membrane 120 (e.g., Nafion or another proton conductor such as, but not limited to, those used as proton exchange membranes (PEMs) for fuel cells) and a counter electrode network 110. The electrode network or counter electrode 110 may include carbon felt with platinum nanoparticles. In this configuration, the hydrogen and/or protons can be stored at lower than or near ambient pressure(s) or at higher-than-ambient pressure(s). In use, once the counter electrode network 110 is exposed to air 150 (or other materials that react with hydrogen 132), an induced current and voltage results.

Figure 2:
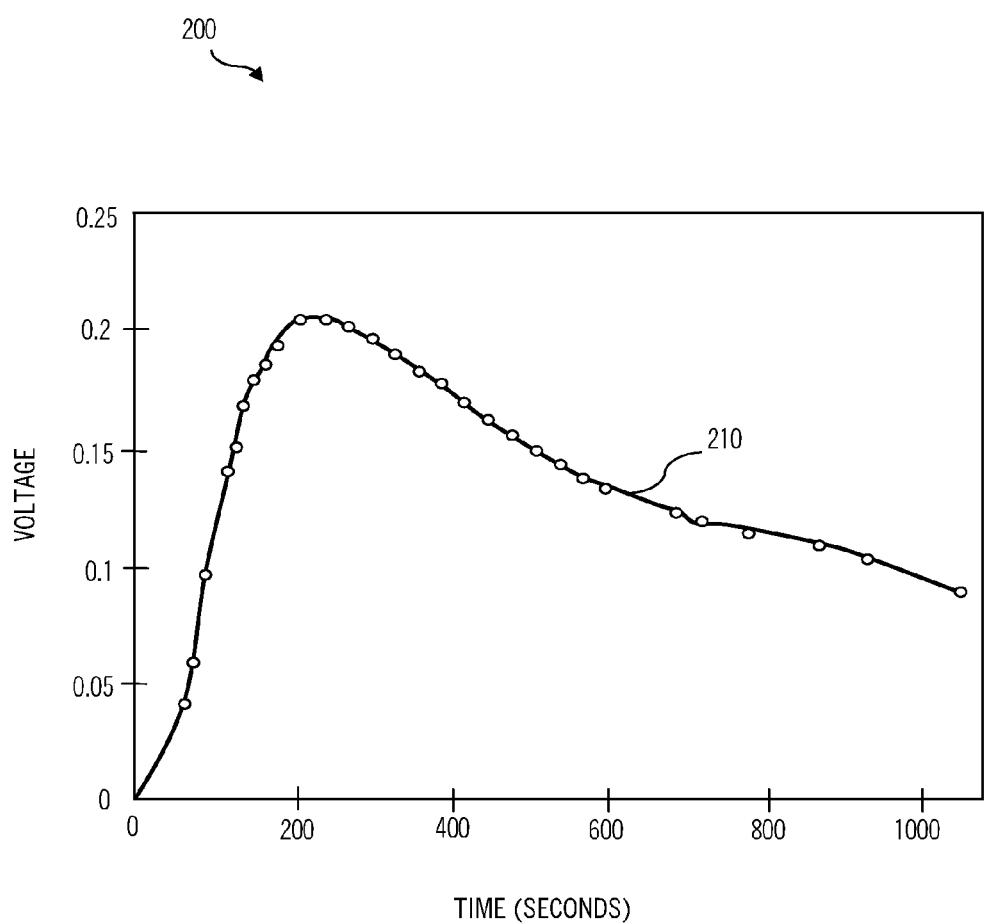
FIG. 2 illustrates a current versus voltage plot of measured data from one tested or evaluated prototype of an energy storage device as may be configured according to the schematic shown in FIG. 1.

FIG. 2 illustrates a current versus voltage graph 200 showing with line 210 measured voltages/data from a hydrogen electrochemical storage device 100 formed in this manner The data 210 demonstrates that once the counter electrode 110 was exposed to air 150, the stored hydrogen and/or protons 132 were conducted along the material of the hydrogen storage electrode 130 through the ion conducting membrane 120 and reacted with the oxygen in the air 150 within the counter electrode network 110 to produce an electrical potential and current. In this example/test, nearly all the stored hydrogen/protons were consumed.

In this configuration of the device 100, the lightweight material of storage electrode 130 can be loaded with hydrogen/protons via the use of chemical processes or electrochemically by applying an appropriate voltage to reduce a hydrogen containing material in the counter electrode network 110. As shown in FIG. 2, the device 100 in this configuration with about a 15 percent by weight loading of hydrogen/protons in the lightweight material of storage electrode 130 results in an electrochemical device 100 with the potential of over about 4500 WH/Kg stored energy density. By comparison, lead acid batteries typically have energy densities in the range of about 50 WH/Kg and state-of-the-art Li batteries may have energy densities between about 100 and about 150 WH/Kg. Of course, the 15 percent by weight hydrogen/proton loading is just one example of a useful storage or loading of hydrogen achievable with or provided by the electrode 130 in a device 100. The actual loading may be higher or lower in practice and may be chosen or adjusted to suit specific electrode materials, configurations of electrodes 110, 130 and membrane 120, and/or energy demands for the device 100.

In another example of device 100, the storage electrode (or anode) 130 may include a sealed, lightweight material that is electrochemically/chemically loaded with hydrogen/protons. The electrode 130 may be combined or integrated with an ion conducting membrane 120 and a counter electrode (or cathode) 110 made with a material that has an affinity for hydrogen. The counter electrode 110 may be a solid or liquid in which the protons 132 from the hydrogen electrode 130 transition across the ion conducting membrane 120 and integrate with the counter electrode material. Examples of useful counter electrode materials include hydride forming metals, metal oxides, electrochromic materials, chemically modified lightweight materials, and/or any material with an affinity for hydrogen. Depending on the counter electrode materials used, it may be possible to "recharge" the hydrogen storage electrode 130 as shown at 134, such as with an applied voltage to form a reversible energy storage device 100.

In another exemplary device 100, the hydrogen storage electrode 130 may include a sealed, lightweight material electrochemically/chemically loaded with hydrogen (e.g., in atomic, proton, and/or molecular form). The device 100 again includes an ion conducting membrane 120 and a counter electrode 110 made with material having an affinity for hydrogen. In this device 100, though, the ion conducting membrane 120 may be adapted to conduct ions from the counter electrode 110 to the hydrogen electrode 130, where the elements chemically bind to provide the electrochemical potential of the device 100.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope. As will be understood from the foregoing, one distinguishing aspect of the hydrogen-based electrochemical energy storage is that the storage electrode includes lightweight material selected for its ability to adsorb hydrogen rather than absorbing and strongly bonding to or with the hydrogen. Due to the simplicity of this unique hydrogen sorption mechanism, a multitude of configurations for storage devices and storage electrodes is possible including devices with high energy densities, low cost, large operating temperature ranges, no or few moving parts, high cycle life, and/or high durability.

In some embodiments, the anode or hydrogen storage electrode is formed of other materials that are lightweight and do not form a true chemical bond with hydrogen atoms/protons. For example, the material may include an oxycarbon, a nitrogen carbon, a boron carbon, boron or a boron compound, aluminum or an aluminum compound, magnesium or a magnesium compound, lithium or a lithium compound, silicon or a silicon compound, and the like. Materials having greater atomic weight generally produce a lower weight efficiency (e.g., when compared with graphite and other carbon-based materials and the like) when used to form the hydrogen storage electrode.

The cathode of the storage devices described herein and hereafter claimed may generally be formed of any material that wants hydrogen more or has a greater affinity for hydrogen than the storage material (e.g., oxygen, a metal hydride, lithium, or the like). The storage electrode material generally will be "porous" in the sense that it will contain spaces, pores, passageways, channels, cracks, intercalation layers, and so on that are just large enough (such as having passageways or other spacings that are greater than about 3 Angstroms) to allow intercalation of protons, atomic hydrogen, or molecular hydrogen (e.g., allow the weakly bound hydrogen to be conducted from the storage electrode to the counter electrode).

The ion conducting membrane or electrolyte layer may be a proton conductor and may vary in its make up. For example, the electrolytes used in lithium ion batteries may be used in some cases or embodiments of the storage devices such as device 100. In fuel cell-type applications of the storage device (where oxygen may be the cathode or counter electrode), it may be useful to use inorganic proton conductors such as beta alumina, tantalum oxide, nickel oxide, tungsten oxide, and the like to form the electrolyte layer of the storage device.

The invention claimed is:

1. An energy storage device, comprising:
a counter electrode;
a storage electrode loaded with a hydrogen storage material, wherein hydrogen is retained in the hydrogen storage material with relatively low chemical bonding and wherein the counter electrode comprises a material having an affinity for hydrogen greater than the low molecular weight hydrogen storage material; and
an ion conducting membrane interposed between the counter electrode and the storage electrode.

2. The energy storage device of claim 1, wherein the hydrogen storage material comprises a low molecular weight material having an atomic weight of less than about 20.

3. The energy storage device of claim 2, wherein the hydrogen storage material comprises at least one of hydrogen, lithium, beryllium, carbon, boron, nitrogen, oxygen, fluorine, sodium, magnesium, aluminum, silicon, phosphorous, sulfur, chlorine, potassium, calcium, and other elements in combination.

4. The energy storage device of claim 1, wherein the hydrogen storage material adsorbs the retained hydrogen.

5. The energy storage device of claim 4, wherein the retained hydrogen in the hydrogen storage material comprises at least one of protons, mono-hydrogen, and dihydrogen and wherein the storage electrode comprises a network of passageways for storage and conduction of the retained hydrogen.

6. The energy storage device of claim 1, wherein the counter electrode comprises an exchange matrix for materials selected from the group consisting of non-noble elements with an affinity for hydrogen.

7. The energy storage device of claim 1, wherein the hydrogen storage material stores at least about 10 percent by weight of the retained hydrogen at ambient temperature and pressure.

8. The energy storage device of claim 7, wherein the hydrogen storage material stores at least about 15 percent by weight of the retained hydrogen and wherein the energy storage device has a stored energy density of greater than about 4500 Watt hours per kilogram.

9. The hydrogen storage device of claim 7, wherein the hydrogen storage materials stores at least about 10 percent by weight of the retained hydrogen at sub-ambient temperatures and pressures and at higher than ambient temperatures and pressures.

10. An energy storage device, comprising:
a cathode layer comprising at least one material with an affinity for hydrogen;
an anode layer comprising a low molecular weight hydrogen storage material including at least one elemental material with an atomic weight of less than about 20, whereby a quantity of hydrogen is stored in the hydrogen storage material with relatively low chemical bonding; and
a membrane sandwiched between the cathode layer and the storage electrode that is adapted for conducting hydrogen ions between the layers.

11. The energy storage device of claim 10, wherein the counter electrode further comprises at least one dissociation material.

12. The energy storage device of claim 10, wherein the one elemental material is one of: hydrogen, lithium, beryllium, carbon, boron, nitrogen, oxygen, fluorine, sodium, magnesium, aluminum, silicon, phosphorous, sulfur, chlorine, potassium, calcium, and other elemental materials in combination.

13. The energy storage device of claim 10, wherein the hydrogen storage material adsorbs the stored hydrogen.

14. The energy storage device of claim 13, wherein the adsorbed hydrogen comprises protons, mono-hydrogen, or dihydrogen and wherein the storage electrode comprises a network of passageways for storage and conduction of the adsorbed hydrogen.

15. A hydrogen-based electrochemical storage device, comprising:
a counter electrode comprising an exchange matrix for elements selected from the group consisting of non-noble elements with an affinity for hydrogen;
a hydrogen storage electrode loaded with a hydrogen storage material, wherein hydrogen is retained in the hydrogen storage material via chemical bonding with less energy than provided in carbon-hydrogen bonding; and
a layer of ion conducting material interposed between the counter electrode and the storage electrode.

16. The storage device of claim 15, wherein the exchange matrix further contains elements or compounds assisting in the electrochemical and dissociation processes of the materials selected from the group consisting of non-noble elements with an affinity for hydrogen.

17. The storage device of claim 15, wherein the counter electrode comprises an exchange matrix that comprises elements or compounds with at least one of: iron, cobalt, nickel, technetium, ruthenium, rhodium palladium, rhenium osmium, iridium, platinum, mercury, catalytic alloys, and other materials with an affinity for hydrogen.

18. The storage device of claim 15, wherein the hydrogen storage material stores at least about 10 percent by weight of the hydrogen at ambient temperature and pressure.

19. The storage device of claim 18, wherein the hydrogen storage material stores at least about 15 percent by weight of the hydrogen and wherein the storage device has a stored energy density of greater than about 4500 Watt hours per kilogram.

20. The storage device of claim 18, wherein the hydrogen storage materials stores up to about 10 percent or more by weight of the hydrogen at temperatures and pressures that are either lower than ambient or higher than ambient.

* * * * *